(12) United States Patent
Shin et al.

(10) Patent No.: US 9,960,427 B2
(45) Date of Patent: May 1, 2018

(54) CONDUCTIVE MATERIAL FOR LITHIUM SECONDARY BATTERY AND ELECTRODE FOR LITHIUM SECONDARY BATTERY INCLUDING THE SAME

(71) Applicant: LG Chem, Ltd., Seoul (KR)

(72) Inventors: Sun Young Shin, Daejeon (KR); Sang Wook Woo, Daejeon (KR); Eun Kyung Kim, Daejeon (KR); Je Young Kim, Daejeon (KR); Hyun Wook Kim, Daejeon (KR); Su Min Lee, Daejeon (KR)

(73) Assignee: LG Chem, Ltd. (KR)

( * ) Notice: Subject to any disclaimer, the term of this patent is extended or adjusted under 35 U.S.C. 154(b) by 146 days.

(21) Appl. No.: 14/320,745

(22) Filed: Jul. 1, 2014

(65) Prior Publication Data

US 2014/0356722 A1 Dec. 4, 2014

Related U.S. Application Data

(63) Continuation of application No. PCT/KR2014/004842, filed on May 30, 2014.

(30) Foreign Application Priority Data

May 30, 2013 (KR) .................. 10-2013-0062102

(51) Int. Cl.
| | |
|---|---|
| *H01M 4/62* | (2006.01) |
| *H01M 4/04* | (2006.01) |
| *H01M 4/133* | (2010.01) |
| *H01M 4/131* | (2010.01) |
| *H01M 4/485* | (2010.01) |

(Continued)

(52) U.S. Cl.
CPC ......... *H01M 4/625* (2013.01); *H01M 4/0402* (2013.01); *H01M 4/131* (2013.01); *H01M 4/133* (2013.01); *H01M 4/485* (2013.01); *H01M 4/587* (2013.01); *H01M 10/052* (2013.01); *H01M 2220/30* (2013.01)

(58) Field of Classification Search
CPC ..... H01M 4/0402; H01M 4/133; H01M 4/625
USPC ....................... 429/231.4; 427/113
See application file for complete search history.

(56) References Cited

U.S. PATENT DOCUMENTS

| 7,623,340 B1 | 11/2009 | Song et al. |
| 2009/0117467 A1 | 5/2009 | Zhamu et al. |
| 2009/0269667 A1 | 10/2009 | Antonietti et al. |

(Continued)

FOREIGN PATENT DOCUMENTS

| CN | 102117911 A | 7/2011 | |
| JP | H11246209 A * | 9/1999 | .............. H01M 4/02 |

(Continued)

OTHER PUBLICATIONS

Machine Translation JPH11246209A.*

(Continued)

*Primary Examiner* — Sarah A. Slifka
*Assistant Examiner* — Victoria H Lynch
(74) *Attorney, Agent, or Firm* — Lerner, David, Littenberg, Krumholz & Mentlik, LLP

(57) ABSTRACT

The present invention relates to a conductive material for a secondary battery, including a pitch coated graphene sheet, an anode for a secondary battery including the same, and a lithium secondary battery including the electrode.

4 Claims, 1 Drawing Sheet

(51) Int. Cl.
  *H01M 4/587*  (2010.01)
  *H01M 10/052* (2010.01)

(56) References Cited

U.S. PATENT DOCUMENTS

| | | | | |
|---|---|---|---|---|
| 2010/0008021 A1* | 1/2010 | Hu | ............................ | C01B 31/02 |
| | | | | 361/502 |
| 2010/0143798 A1* | 6/2010 | Zhamu | .................. | H01M 4/133 |
| | | | | 429/212 |
| 2011/0183180 A1* | 7/2011 | Yu | ............................ | H01G 11/36 |
| | | | | 429/128 |
| 2012/0064409 A1 | 3/2012 | Zhamu et al. | | |
| 2013/0004846 A1 | 1/2013 | Kim et al. | | |
| 2013/0059174 A1* | 3/2013 | Zhamu | .................. | H01M 4/583 |
| | | | | 429/50 |
| 2013/0089784 A1 | 4/2013 | Cho et al. | | |
| 2013/0230709 A1 | 9/2013 | Zhou et al. | | |

FOREIGN PATENT DOCUMENTS

| | | | |
|---|---|---|---|
| JP | 2007220324 A | 8/2007 | |
| JP | 2012-033375 A | 2/2012 | |
| JP | 2012074297 A | 4/2012 | |
| KR | 20100088667 A | 8/2010 | |
| KR | 2010-0137622 A | 12/2010 | |
| KR | 2011-0029321 A | 3/2011 | |
| KR | 10-1037766 B1 | 5/2011 | |
| WO | 2012088683 A1 | 7/2012 | |

OTHER PUBLICATIONS

International Search Report from PCT/KR2014/004842 dated Sep. 29, 2014.
Hummers, William S., et al., "Preparation of Graphitic Oxide" J. Am. Chem. Soc. (1958), 80(6), 1339.
Stankovich, Sasha, et al., "Synthesis of graphene-based nanosheets via chemical reduction of exfoliated graphite oxide," Carbon 45 (2007) pp. 1558-1565.
Supplemental Search Report from corresponding European Appln. No. 14793424.4, dated Jun. 1, 2015.

* cited by examiner

[FIG. 1]
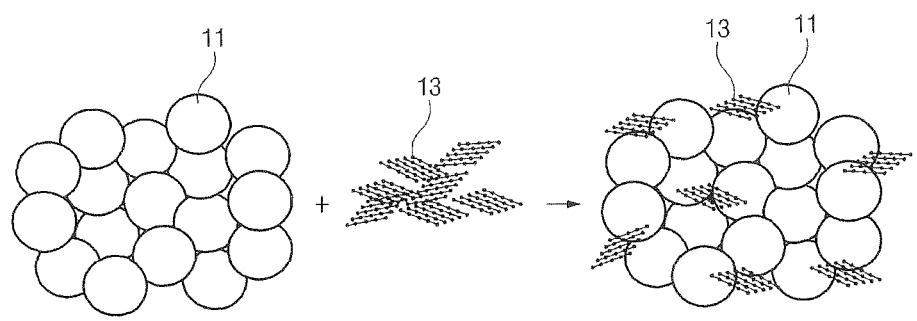
[FIG. 2]
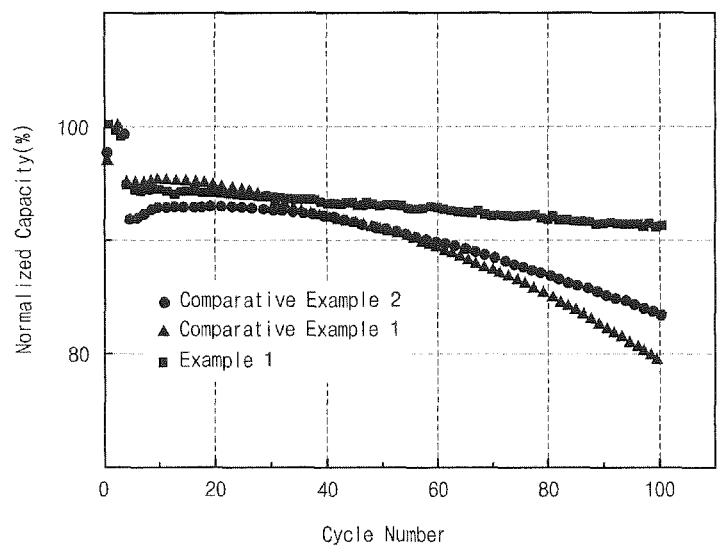

CONDUCTIVE MATERIAL FOR LITHIUM SECONDARY BATTERY AND ELECTRODE FOR LITHIUM SECONDARY BATTERY INCLUDING THE SAME

CROSS-REFERENCE TO RELATED APPLICATIONS

The present application is a continuation of International Application No. PCT/KR2014/004842 filed on May 30, 2014, which claims the benefit of Korean Patent Application No. 10-2013-0062102 filed on May 30, 2013, the disclosures of which are incorporated herein by reference.

TECHNICAL FIELD

The present invention relates to a conductive material for a lithium secondary battery and an electrode for a lithium secondary battery including the same.

BACKGROUND ART

According to the rapid miniaturization, weight lightening and high performance establishment of electronic products, electronic equipments, and communication equipments, the performance improvement of a lithium secondary battery used as the power source thereof is greatly required.

A lithium secondary battery includes a cathode including an electrode active material, a binder and a conductive material as main components, an anode, a separator disposed between the cathode and the anode, and an electrolyte.

In the anode, since a carbon-based material as the electrode active material has high conductivity in itself, the carbon-based material may play the role of the conductive material at the same time. However, according to the progress of charging and discharging, an anode active material may react with lithium ions, and an electron moving path may become unstable. To supplement this defect, a separate conductive material is additionally necessary.

As described above, the basic performance of a lithium secondary battery is dependent greatly on the properties of a material such as an electrode active material, a conductive material, etc.

Particularly, a conductive material plays the role of improving electrical conductivity between electrode active materials, or an electrode active material and a current collector. In the case that the amount of the conductive material is insufficient, or the role thereof is improperly conducted, unreacted portion in the electrode active material may increase, and battery capacity may decrease. In addition, high speed charging and discharging properties, high-rate charging and discharging efficiency and initial charging and discharging efficiency may be negatively influenced.

Generally, a dot type conductive material such as acetylene black or carbon black has been used as the conductive material, however in this case, high-rate discharging properties and initial charging and discharging efficiency are low, and the loss of an electrode active material may be generated.

Accordingly, the development of a conductive material for a secondary battery for improving charging and discharging efficiency, etc. is urgently needed.

DISCLOSURE OF THE INVENTION

Technical Problem

An aspect of the present invention is to solve the above-described defects and to provide a conductive material for a lithium secondary battery having highly improving effect of conductivity and a method of manufacturing the same.

Another aspect of the present invention is to provide an electrode for a secondary battery including the conductive material.

Another aspect of the present invention is to provide a lithium secondary battery including the electrode for a secondary battery and having improved cycle life characteristics.

Technical Solution

According to an aspect of the present invention, there is provided a conductive material for a secondary battery including a pitch coated graphene sheet.

According to another aspect of the present invention, there is provided a method of manufacturing a conductive material of a secondary battery including forming a pure graphene sheet; mixing the graphene sheet and coal-based pitch; and baking the mixture thus obtained at a high temperature to manufacture a pitch coated graphene sheet.

According to another aspect of the present invention, there is provided an electrode for a secondary battery including a current collector, and an electrode active material layer coated on the current collector, wherein the electrode active material layer comprises an electrode active material, the conductive material for a secondary battery according to the present invention, and a binder According to another aspect of the present invention, there is provided a lithium secondary battery including a cathode, an anode, a separator disposed between the cathode and the anode, and an electrolyte, wherein one of the cathode and the anode includes the electrode according to the present invention.

Advantageous Effects

According to the present invention, an electrode including a pitch coated graphene sheet as a conductive material is provided, and a secondary battery having improved cycle safety and cycle life characteristics may be manufactured.

BRIEF DESCRIPTION OF THE DRAWINGS

The accompanying drawings are included to provide a further understanding of the inventive concept, and are incorporated in and constitute a part of this specification. The inventive concept may, however, should not be construed as limited to the accompanying drawings.

FIG. 1 is illustrated for explaining a method of manufacturing an electrode for a secondary battery according to the present invention; and FIG. 2 is a graph illustrating capacity measured according to the cycle number of secondary batteries manufactured in an example of the present invention and comparative examples.

MODE FOR CARRYING OUT THE INVENTION

Hereinafter, exemplary embodiments of the present invention will be described in more detail to assist the understanding of the present invention. The embodiments are provided so that this disclosure will be thorough and complete, and will fully convey the scope of the inventive concept to those skilled in the art. It will be understood that terms, such as those defined in commonly used dictionaries, should be interpreted as having a meaning that is consistent with their meaning in the context of the relevant art.

Recently, to improve electrical conductivity between active materials or between an active material and a current collector during manufacturing a lithium secondary battery, researches on using graphene capable of self-expressing capacity as a conductive material, and having a large contacting area of an active material with a current collector and great moving path of electrons are conducted. However, the graphene has not much improving effect of the conductivity when compared to a commonly used dot type conductive material such as carbon black and exposes a great portion of sides. Thus, the reactivity with an electrolyte is high, and the life characteristics of a secondary battery are deteriorated.

Thus, a conductive material for a secondary battery having increased conductivity by improving the defects of the graphene is provided in the present invention.

Particularly, in an embodiment of the present invention, a conductive material for a secondary battery including a pitch coated graphene sheet is provided.

The pitch includes coal-based pitch and is included by about 6 to 15 wt % based on the total amount of the conductive material for a secondary battery. In the case that the amount of the pitch in the conductive material for a secondary battery is less than 6 wt %, the edge portion of the surface of the graphene sheet may be partially exposed, and the improving effect of conductivity may not be obtained. In the case that the amount of the pitch is greater than 15 wt %, an excessive amount of amorphous carbon layer is included, and the deterioration of the capacity of the electrode active material may occur. Particularly, the coal-based pitch may be included by about 10 wt % based on the total amount of the conductive material for a secondary battery.

In addition, in the conductive material for a secondary battery according to the present invention, the graphene sheet is preferably a graphene sheet of a single layer separated from graphite by conducting a chemical exfoliation process.

In addition, the coal-based pitch may be a coated type on the whole surface or on a portion of the graphene sheet.

In addition, in an embodiment of the present invention, a method of preparing a conductive material for a secondary battery including: preparing a pure graphene sheet; mixing the graphene sheet and coal-based pitch; and baking the mixture thus obtained at a high temperature to manufacture a pitch coated graphene sheet, is provided.

In the above-described method, the pure graphene sheet may be formed by a common method including forming graphene oxide from graphite, exfoliating a graphene sheet and reducing using a reducing agent (See J. Am. Chem. Soc. 1958, 80(6), 1339 and Carbon 2007, 45, 1558). The commonly manufactured graphene oxide sheet may include a large amount of oxygen and may have low conductivity, and so, the exfoliated graphene oxide sheet having a single layer from the graphite may be heat treated under a mixture gas atmosphere of $Ar/H_2$ to remove the oxygen included in the graphene sheet. In this case, the heat treating may be preferably conducted at about 1,100° C., and may be conducted at a lower temperature.

In the method of the present invention, the pitch coating layer may be a coated type on the whole surface or a portion of the graphene sheet.

In addition, the baking at the high temperature may be conducted by mixing the graphene sheet with the pitch, maintaining the mixture at around the softening temperature of the pitch of 250° C. for 3 hours under an air atmosphere, increasing the temperature at a rate of 2° C./min to 1,150° C. under a nitrogen atmosphere, and baking at 1,150° C. for 5 hours for carbonization.

Meanwhile, in the graphene sheet coating step, a coating material commonly used for coating the surface of an active material, an amorphous carbon material such as heavy oil, etc., that may not induce a side reaction with an electrolyte, may be used other than the pitch for the coating.

As described above, petroleum-based pitch is coated on the graphene sheet of a single layer, and the pitch-coated graphene sheet is used as a conductive material in the present invention. Thus, the exposing area of the graphene sheet commonly used may be decreased, and the side reaction with the electrolyte may be prevented. In addition, energy density per area may be increased to increase the conductivity. Particularly, since the pitch coated graphene sheet may play the roles of the conductive material and the active material at the same time, the energy density of a secondary battery may be increased to improve the life characteristics.

In addition, in a preferred embodiment of the present invention, an electrode for a secondary battery including a current collector, and an electrode active material layer coated on the current collector, wherein the electrode active material layer comprises an electrode active material 11, a conductive material 13 according to the present invention, and a binder (not shown), is provided (See FIG. 1).

In this case, the electrode of the present invention may be a cathode or an anode.

Particularly, in the electrode for a secondary battery of the present invention, the current collector may be any one that may not induce the chemical change of a battery and has conductivity without specific limitation, for example, copper, stainless steel, aluminum, nickel, titanium, baked carbon, surface treated copper or stainless steel with carbon, nickel, titanium, silver, etc., an aluminum-cadmium alloy, etc. In addition, various shapes including a film, a sheet, a foil, a net, a porous material, a foamed material, a nonwoven fabric, etc. including minute embossing formed on the surface thereof may be used.

In addition, the electrode active material may be a single material or a mixture of two or more selected from the group consisting of a lithium containing titanium complex oxide (LTO) that may absorb and release lithium ions, carbon and graphite materials such as natural graphite, synthetic graphite, expanded graphite, carbon fiber, non-graphitizable carbons, carbon black, carbon nanotube, fullerene, activated carbon, etc., a metal oxide (MeOx) of a metal (Me) such as Al, Si, Sn, Ag, Bi, Mg, Zn, In, Ge, Pb, Pd, Pt, Ti, etc., capable of forming an alloy with lithium. More particularly, the electrode active material may be spherical natural graphite, for example, amorphous and coated spherical natural graphite.

In addition, the binder is a component assisting the bonding of the active material and the conductive material and the bonding to the current collector, and is generally included by 1 to 20 wt % based on the total amount of the electrode active material. The binder may include polyvinylidene fluoride (PVdF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), sulfonated-EPDM, styrene-butadiene rubber (SBR), fluorine rubber, diverse copolymers thereof.

The conductive material of the present invention may be included by 1 to 15 wt % based on the total amount of the electrode active material to improve the conductivity of the active material. In the case that the amount of the conductive material is less than 1 wt %, the life characteristics may be deteriorated during cycling for a long time. In the case that the amount exceeds 15 wt %, more binder is necessary during manufacturing a slurry, and so, the amount of the active material is relatively decreased, and capacity may be lowered.

In addition, in an embodiment of the present invention, a lithium secondary battery including a cathode, an anode, a separator disposed between the cathode and the anode, and an electrolyte, wherein one of the cathode and the anode includes the electrode according to the present invention, is provided.

Hereinafter, the present invention will be explained in more detail through examples and comparative examples. The present invention may, however, be embodied in different forms and should not be construed as limited to the embodiments set forth herein.

EXAMPLES

Preparation Example 1: Manufacture of Pitch Coated Graphene

A pure graphene sheet (90 wt %) separated from graphite and coal-based pitch (10 wt %) were mixed and maintained at 250° C., which is a round the softening point of the pitch, for 3 hours under an air atmosphere. The temperature was increased at a rate of 2° C./min to 1,150° C. under a nitrogen atmosphere, and baking was conducted at 1,150° C. for 5 hours for carbonization to manufacture a pitch coated graphene sheet.

Example 1

91 wt % of $LiCoO_2$, 6 wt % of graphite as a conductive material, and 3 wt % of PVdF as a binder were mixed, and the mixture thus obtained was dispersed in N-methyl-2-pyrrolidone (NMP) to manufacture a slurry for a cathode. The slurry was coated on one side of an aluminum thin film, i.e., a cathode collector, dried and compression molded using a roller press to manufacture a cathode.

Then, 95% of spherical shaped natural graphite, 4% of CMC+SBR as a binder, and 1% of the pitch coated graphene sheet according to the Preparation Example 1 as a conductive material were dispersed in $H_2O$ to manufacture a slurry for an anode. The slurry was coated on one side of a copper (Cu) thin film, i.e., an anode collector, and compression molded using a roller press to manufacture an anode.

After that, a polyolefin-based separator was disposed between the cathode and the anode to fabricate an electrode assembly. An electrolyte obtained by dissolving 1 M $LiPF_6$ solute in a mixture solvent of ethylene carbonate (EC) and dimethyl carbonate (DMC) by a volume ratio of 1:1 was injected into the electrode assembly to manufacture a coin full-cell.

Comparative Example 1

An anode, a cathode and a coin full-cell were manufactured by conducting the same procedure explained in Example 1 except for using a common graphene sheet as the conductive material for the anode.

Comparative Example 2

An anode, a cathode and a coin full-cell were manufactured by conducting the same procedure explained in Example 1 except for using carbon black as the conductive material for the anode.

Experimental Example 1

The coin full cells manufactured in Example 1, and Comparative Examples 1 and 2, were charged by 0.1 C and discharged by 0.1 C for initial 3 cycles and charged and discharged by 1 C/1 C for the next 97 cycles. In this case, the charging was conducted by a CC-CV mode (0.005 C cut off), and the discharging was conducted by a CC mode. Charging and discharging voltage section was 2.5 to 4.2 V. Normalized capacity according to cycle number, that is, capacity life characteristics are illustrated in FIG. 2.

Referring to FIG. 2, cell performance was the best for the cell manufactured in Comparative Example 1 using a common graphene as the conductive material for the initial time period of charging and discharging. However, as the cycle proceeds, the cell performance of the cell manufactured in Example 1 using the pitch coated graphene sheet according to the present invention as the conductive material was the best.

While this invention has been particularly shown and described with reference to preferred embodiments thereof and drawings, it will be understood by those skilled in the art that various changes in form and details may be made therein without departing from the spirit and scope of the invention as defined by the appended claims.

The invention claimed is:

1. A method of manufacturing a secondary battery containing a pitch coated graphene sheet as a conductive material in an anode of the secondary battery, the method comprising:
    forming a pure graphene sheet;
    mixing the graphene sheet and the coal-based pitch to form a mixture consisting of the graphene sheet and the coal-based pitch;
    baking the mixture at a high temperature to manufacture the pitch coated graphene sheet, wherein the baking at the high temperature is conducted by maintaining at 250° C. for 3 hours under an air atmosphere, increasing the temperature at a rate of 2° C./min to 1,150° C. under a nitrogen atmosphere, and baking at 1,150° C. for 5 hours for carbonization to form the pitch coated graphene sheet; and
    making an anode slurry comprising an anode active material, a binder and a conductive material wherein the conductive material consists of the pitch coated graphene sheet,
    wherein the pitch coated graphene sheet is included in an amount of 1 to 15 wt % based on a total amount of the anode active material in the anode slurry,
    wherein the pitch is included in an amount of 6 to 15 wt % based on a total amount of the conductive material for the secondary battery.

2. The method of claim 1, wherein the pure graphene sheet is a graphene sheet of a single layer separated from graphite through a chemical exfoliating process.

3. The method of claim 2, wherein the forming of the graphene sheet comprises heat treating the separated graphene sheet under an $Ar/H_2$ mixture gas atmosphere to remove oxygen in the graphene sheet.

4. The method of claim 1, wherein the amount of pitch included is 6 to 10 wt % based on the total amount of the conductive material for the secondary battery.

* * * * *